Figure 3:
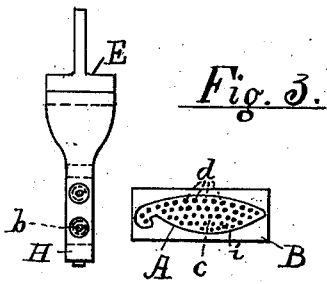

(No Model.)

J. R. WILLIAMS.
CIGAR WRAPPER CUTTER.

No. 297,898. Patented Apr. 29, 1884.

Attest.
William J. Gerth.
Henry Theberath

Inventor.
J. R. Williams per
Thos. S. Crane, Atty.

UNITED STATES PATENT OFFICE.

JOHN R. WILLIAMS, OF NEWARK, NEW JERSEY.

CIGAR-WRAPPER CUTTER.

SPECIFICATION forming part of Letters Patent No. 297,898, dated April 29, 1884.

Application filed November 19, 1883. (No model.)

*To all whom it may concern:*

Be it known that I, JOHN R. WILLIAMS, a citizen of the United States, residing in the city of Newark, county of Essex, and State of New Jersey, have invented certain new and useful Improvements in Cigar-Wrapper Cutters, fully described and represented in the following specification and the accompanying drawings, forming a part of the same.

This invention consists in the combination, with a roller, of a movable cutter carried by a movable pivoted arm, the cutter being formed with a cutting-surface, preferably concentric with the horizontal supporting-pivot, and being provided with a fixed internal platen to support the material laid upon the cutter. The platen is shown in one of the figures of the drawing as perforated, and the space within the cutter is represented as in connection with a tube having the atmosphere exhausted therefrom to induce a vacuum inside the cutter, and thus to draw the material into close contact with the perforated platen.

I will first point out the construction shown in the drawings, and then indicate the essential points in my invention.

Figure 1:
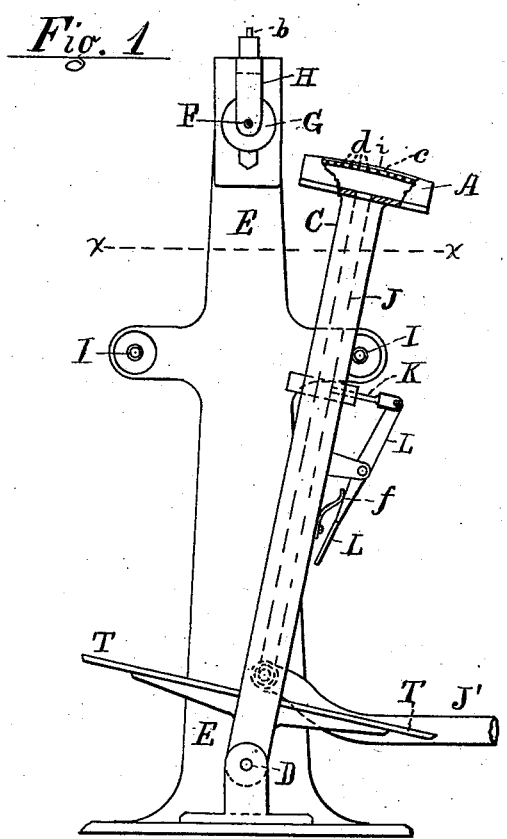
Figure 2:
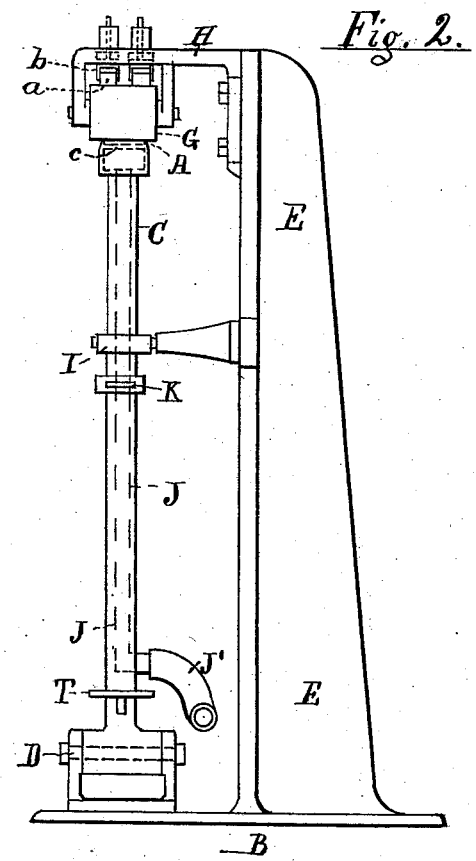

Figure 1 is a front elevation of a machine embodying my improvements, and Fig. 2 is a side view of the same. Fig. 3 is a plan of the parts above line $x\ x$ in Fig. 1.

A is the cutter, attached to a base, B, which is mounted at the upper end of an arm, C, so as to move with the arm from one side to the other when moved by the operator. The arm is pivoted at the bottom to a fulcrum, D, and is provided with laterally-projecting treadles T above the fulcrum, to which the operator may apply his feet when sitting before the arm and cutter. A pedestal or column, E, is mounted upon the same base as the fulcrum, and is extended behind the arm to a point above the cutter, where it sustains an arbor or shaft, F, and roller G, the latter being in a frame, H, to operate in contact with the upper surface of the cutter. The roller is fitted loosely to the arbor, so as to be pressed toward the cutter by auxiliary rolls $a\ a$, which are hung in carriers $b\ b$, supported in the frame H. The springs for pressing the carriers elastically are not shown herein, but are shown and claimed in another patent application No. 104,143, filed by me August 18, 1883, and form no part of my present invention. With this construction it is evident that the cutter can be oscillated from right to left and back again in contact with the roller G by merely pressing alternately upon the treadles T, stops I being affixed to the column to arrest the movement of the arm C at the proper limit. This limit is preferably arranged, as shown in Fig. 1, so that the cutter is moved entirely clear of the roller G to expose its upper surface to the operator for the application of the material from which the cigar-wrappers are to be cut.

In cutting wrappers with this device the operator stretches the tobacco-leaf over the edges of the cutter and holds it there while moving the cutter sidewise beneath the roller, the pressure of the latter upon the upturned edge $i$ of the cutter operating to sever the leaf and to deposit a finished wrapper within the cutting-edge. To sustain the leaf when stretched over the convex surface of the cutter, and to secure the ready removal of the wrapper from within its edge, I fix a platen, $c$, as shown in the part section in Fig. 1, inside the cutter, just below the cutting-edge. The leaf is held by atmospheric pressure against the cutter during the cutting operation, as described by me in a previous application for a patent, No. 84,667, filed February 10, 1883. I form the platen with perforations $d$, and connect the interior of the cutter with an exhausting apparatus of any suitable character by means of a pipe, J. The pipe is shown formed by making the arm C hollow to a point near the fulcrum, where it is continued by a flexible tube, J', to the exhausting apparatus, said tube J' permitting the arm and cutter to vibrate back and forth without being disconnected from the exhaust mechanism.

I disclaim in this application the subject-matter shown and described in my application No. 84,667, filed February 10, 1883.

To regulate the operation of the exhaust upon the tobacco-leaf, a gate, K, is inserted in the pipe J above the treadle, and is provided with a lever, L, arranged within reach of the operator's knee when his foot is on the treadle. With this construction the operator can control the action of the atmosphere upon the leaf and regulate all the movements of the cutter and valve without using his hands at all. The operator is thus enabled to handle the leaves and wrappers with the utmost celerity, and can devote his entire attention to properly applying the leaves to the cutter.

In using the exhaust the operator spreads the leaf over the cutter and then opens the valve K, the leaf being thereby firmly drawn toward the perforated platen and held in place while the operator presses upon the treadle and moves the cutter beneath the roller. The wrapper being cut out of the leaf, the gate-lever is released from the pressure of the operator and is automatically closed by a spring, $f$. The pressure upon the leaf being thus removed, the wrapper may be lifted from the perforated platen and deposited in any suitable receptacle before the operator applies the leaf, to be cut again in a similar manner. It is, however, immaterial to the operation of the roller and cutter whether the arm C be moved by treadles or by hand.

As the function of the exhaust-pipe C is to connect the space within the cutter with the mechanism employed for producing the exhaust, it is obvious that the flexible tube J might be extended to the base of the cutter and some other construction employed to close the pipe, as by compressing the tube itself, as is common in chemical manipulations.

I am aware of the patent to R. V. Appleby, No. 137,524, April 8, 1873, for a roller and inverted cutting-tool, and I therefore disclaim the combination of the roller and cutter as not of my invention.

I am also aware that it is common to construct cutters to rotate in contact with a roller, as in cracker-machines, wrought-nail machines, and other constructions, and I do not therefore claim that a rotating cutter combined with a pressing-roller is new; but my invention differs from them in having the cutter mounted upon the end of an upright vibrating arm pivoted at the bottom, in connection with other elements hereinafter claimed, by which construction the operator is enabled to sit conveniently before the machine, and to vibrate or oscillate the arm and cutter at pleasure, by either his hands or his feet, beneath the stationary pressure-roller G. I therefore disclaim a convex cutter and roller as used in other machines.

I claim the construction described herein, as follows:

1. The combination of the roller, the vibrating arm, the blank-cutter mounted on said arm, a perforated platen within the cutter, and a pipe or tube connecting the exhausting mechanism with the cutter and adapted to move with said cutter, as specified.

2. The combination, with the roller G and the cutter A, of the hollow vibrating arm C, provided with gate or valve K, substantially as described.

3. The combination, with the roller G and convex cutter A, of the upright arm C, pivoted at the bottom, as described, and the treadles T T, affixed to the arm at opposite sides, substantially as and for the purpose set forth.

In testimony whereof I have hereunto set my hand in the presence of two subscribing witnesses.

JNO. R. WILLIAMS.

Witnesses:
 THOS. S. CRANE,
 HENRY F. GÖKEN.